E. A. KING.
SQUARE.
APPLICATION FILED APR. 16, 1908.
919,883.
Patented Apr. 27, 1909.
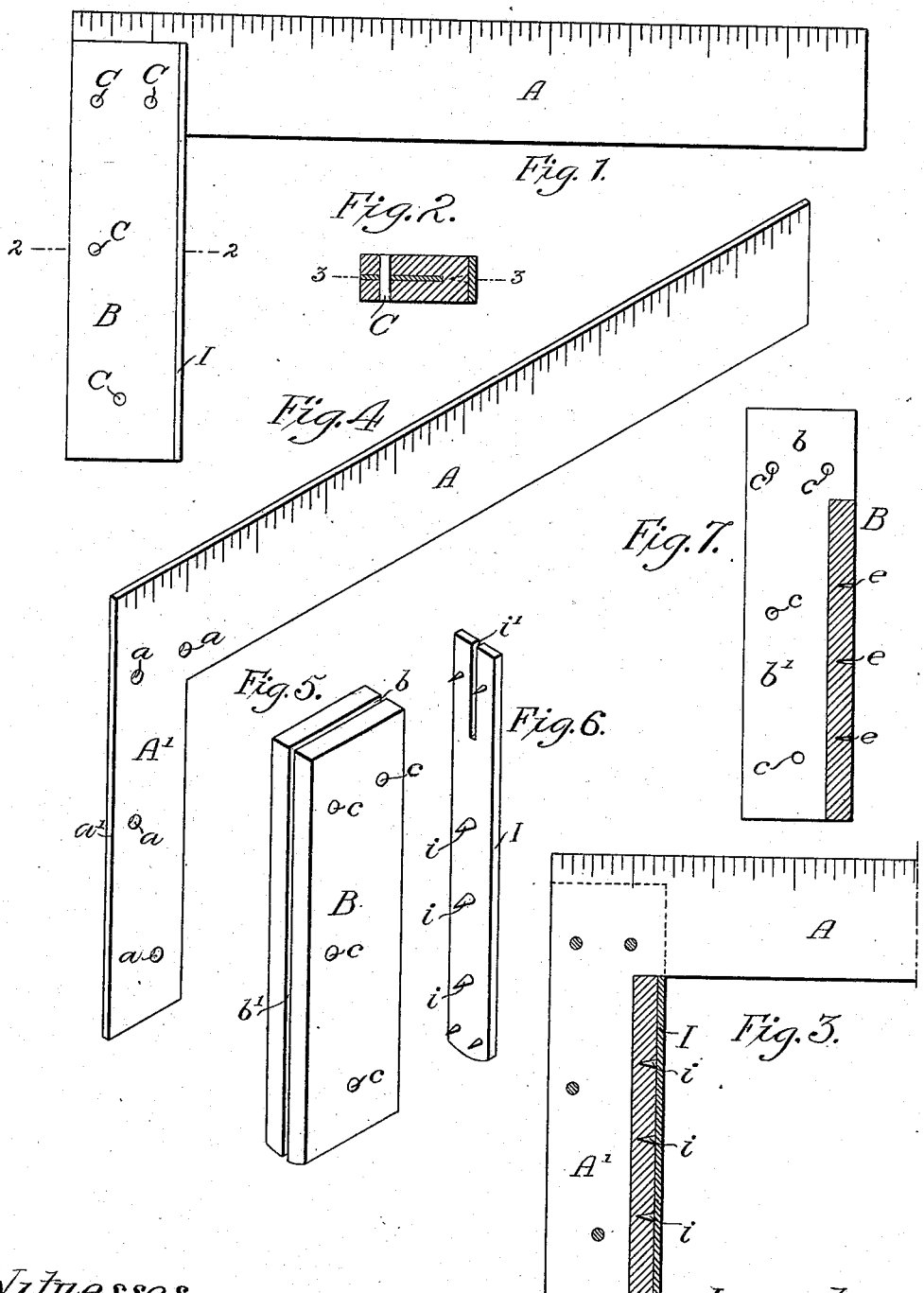
Witnesses,
Walter Chism
Augustus B. Coppes
Inventor
Ernest A. King
by his Attorneys

UNITED STATES PATENT OFFICE.

ERNEST A. KING, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

SQUARE.

No. 919,883.      Specification of Letters Patent.      Patented April 27, 1909.

Application filed April 16, 1908. Serial No. 427,488.

*To all whom it may concern:*

Be it known that I, ERNEST A. KING, a citizen of the United States, residing in Philadelphia, Pennsylvania, have invented certain Improvements in Squares, of which the following is a specification.

One object of my invention is to construct a try square so that the connection between the stock and the blade of the square will be rigidly held together and will not become out of square by rough handling.

A further object of the invention is to so construct the square that the metallic face can be readily applied to the stock without weakening the same.

These objects I attain in the following manner, reference being had to the accompanying drawing, in which:—

Figure 1, is a side view of my improved try square; Fig. 2, is a section on the line 2—2, Fig. 1; Fig. 3, is a section on the line 3—3, Fig. 2, with a portion of the blade broken away; Fig. 4, is a detached perspective view of the blade; Fig. 5, is a detached perspective view of the stock; Fig. 6, is a perspective view of the face of the stock; and Fig. 7, is a detached sectional view of the stock.

A is the blade made of steel and having a shank A' formed in the present instance integral with the blade. This shank may be made in a separate piece and welded to the blade if desired. The blade is preferably marked as shown.

B is the stock made, in the present instance, of hard wood and in one piece, having a transverse groove *b* and a longitudinal groove *b'* of a width to receive a portion of the blade A and the shank A'. There is a series of perforations *c* in the stock alining with the perforations *a* in the blade and its shank and C, C are rivets or pins driven into these perforations and headed in any suitable manner, so as to retain the stock firmly on the shank of the square. Small holes *e* are drilled in the face of the stock, as shown in Fig. 7, adapted to receive pins *i* on the face plate I. This face plate is slotted at *i'* to receive the blade A. I preferably coat the face of the stock B with glue before the face plate is forced in position; the glue and the pins holding the face plate firmly to the stock. In some instances this face plate may be dispensed with, although I prefer to use it. I prefer to so proportion the grooves *b'* in the stock and the shank A' of the blade that the edge *a'* of this shank will be on a line with the back of the stock and this edge *a'* is at a true right angle with the edge of the blade A.

Usually in try squares the blade is simply a plain straight blade and the stock is solid and slotted at the end to receive a portion of the blade, and the blade is held to the stock by two or more pins located close together. Consequently the joint soon becomes loose and the blade is out of square with the stock, but by my invention I am enabled to place the securing pins, which attach the blade to the stock, a suitable distance apart and by providing the blade with a shank I can secure one part rigidly to the other; the inner edge of the shank of the blade resting firmly against the stock. Moreover, in this construction, where the shank is narrower than the stock, I can make the stock out of a single piece so as to allow sufficient material for the drilling of holes in the inner face for the reception of the pins of the face plate.

While I have shown the face plate with pins made integral therewith, these pins may be separate from the face plate, if desired.

I claim:—

1. The combination in a square, of a stock made in a single piece and slotted at one edge and at one end, a blade having an integral shank mounted in the slot, the outer edge of the shank being flush with the outer edge of the stock, and a series of pins attaching the blade permanently to the stock.

2. The combination in a square, of a stock made in a single piece and slotted at the outer edge, a blade having an integral shank, said shank being of a size equal to the width and length of the slot so that it will be flush with the stock at the outer edge and at the end opposite the blade, thus protecting the stock, and means for permanently securing the blade to the stock.

3. The combination in a square, of a wooden stock made in a single piece and slotted at the outer edge and at one end, a metallic face plate slotted at the same end as the stock, means for securing the face plate to the stock, a blade having an integral shank at right angles to the blade and mounted in the slot at the outer edge of the shank, the blade extending into the slots in the end of the shank and face plate, and means for permanently securing the shank to the stock.

4. The combination in a square, of a blade having a shank integral therewith and at right angles to its body portion, a stock having a longitudinal slot at its rear edge, a transverse slot at one end adapted to receive the shank and a portion of the blade, a series of pins attaching the blade and its shank to the stock, a face plate slotted at one end to receive the blade and having a series of pins integral therewith and adapted to be driven into the inner face of the stock.

In testimony whereof, I have signed my name to this specification, in the presence of two subscribing witnesses.

ERNEST A. KING.

Witnesses:
   WM. E. SHUPE,
   WM. A. BARR.